RE 24892
Nov. 11, 1958        O. H. BANKER        2,859,762
FLOW DIVIDER VALVE WITH RELIEF VALVE AND VARIABLE ORIFICE
Filed Nov. 23, 1956
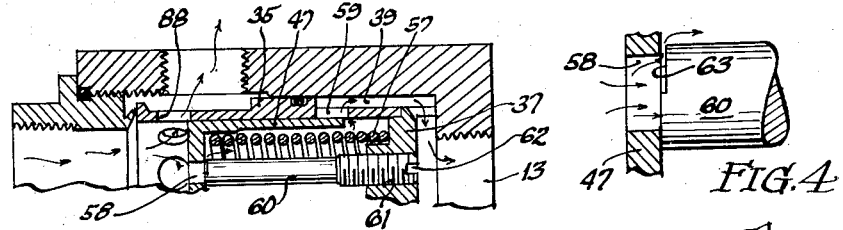
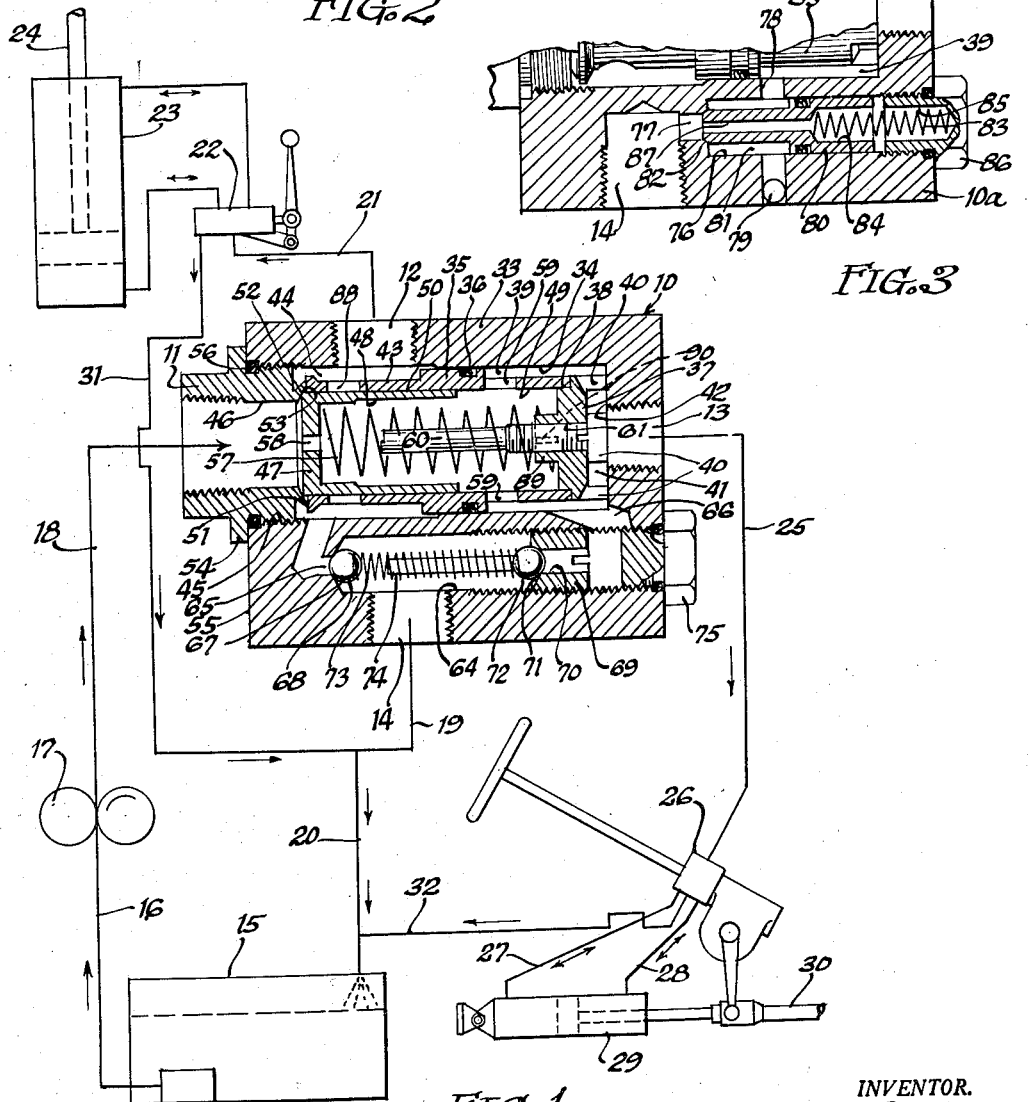
INVENTOR.
Oscar H. Banker
BY Charles J. Vrtiech
Attorney 2,859,762
Patented Nov. 11, 1958

United States Patent Office

2,859,762
FLOW DIVIDER VALVE WITH RELIEF VALVE AND VARIABLE ORIFICE

Oscar H. Banker, Evanston, Ill., assignor to New Products Corporation, Skokie, Ill., a corporation of Delaware Application November 23, 1956, Serial No. 624,112

14 Claims. (Cl. 137—101)

This invention relates to flow dividers for hydraulic systems and particularly to dividers which are adapted to divide the flow from a single pump into two streams so that hydraulically operated devices in such streams can be operated either simultaneously or individually as desired.

Substantially all of the material handling and earth moving equipment presently manufactured is provided with hydraulically operated lift devices for effecting the movement of the material or earth handled. This is true of farm tractors as well as of road-building and other construction vehicles. It is the present trend to equip such vehicles with power steering, again utilizing hydraulically operated piston means for assisting in or effecting the steering movements of the vehicles. The initial installations of power steering in such vehicles were independent units, including a separate pump driven from the same engine. The two-pump system obviously is more costly than a single pump system and hence efforts have been made to utilize a single pump together with suitable flow dividing means for providing the two streams of pressurized hydraulic fluid.

In flow dividers as heretofore constructed an increase in the volume of fluid directed into one stream also caused an increase in volume of fluid directed into the second stream. Thus, to provide a stream of the required maximum capacity in one stream, sufficient pump capacity had to be provided for this stream and for the second stream as thus increased. As a practical matter, however, it is seldom required to operate two hydraulic devices on a vehicle simultaneously at their maximum capacity. For example, the vehicle is generally stationary while the earth-engaging tool carried by the vehicle is in operation. Again, the hydraulic lift for raising a load is operated first and after the load has been elevated, the vehicle is turned in the direction in which the load is to be moved. In a farm tractor, the plow, disc, cultivator, etc. is raised at the end of the row and the tractor is then turned, and after the tractor has been directed into the next row, the farm tool is lowered into the ground. The extra pump capacity required in the flow dividers as heretofore constructed is thus unnecessary and renders such flow dividers inefficient.

In my copending application, Serial No. 602,581, filed Aug. 7, 1956, there is described and claimed a flow divider which functions in a manner opposite to that of the prior devices as described above in that when the flow in one of the streams is increased, the flow in the other stream is decreased, thereby making it possible to use a smaller pump than would otherwise be possible in a multi-device system and hence resulting in a less expensive and also more efficient system. The aforesaid divider also provided means for completely cutting off one stream, the cut-off means being adjustable to regulate the pressure at which the cut-off took place. Individual relief valves were also provided for each stream to limit the pressure in each stream.

The present invention is in the nature of an improvement upon my aforesaid prior flow divider and has for one of its objects the provision of means for adjusting the amount of flow in one of the streams.

As another object this invention seeks to provide an improved and simpler means for limiting the pressures in both streams wherein a single adjustment serves to change the upper limit of pressure in both streams.

A specific object of this invention has within its purview to provide an adjustment of the flow in one of the streams to substantially zero when the flow in the other is a maximum, without causing the device to lock up in the zero setting and providing instead a resumption of flow to the said one of the streams when the flow to the second stream decreases.

These and other objects of this invention will become apparent from the following detailed description when taken together with the accompanying drawings which form a part thereof and in which, Fig. 1 is a cross section through the improved flow divider valve and a schematic diagram of a hydraulic system in which the valve may be used;

Fig. 2 is a fragmentary section of the improved valve similiar to that of Fig. 1, showing the valve in a different stage of operation;

Fig. 3 is a fragmentary section through a modification of the relief valve of Fig. 1; and Fig. 4 is an enlarged fragmentary section through the means for regulating the effectiveness of the orifice through which one of the streams flows.

Referring now to the drawings for a detailed description of the invention and particularly to Fig. 1, the flow divider valve of the present invention is shown in its entirety at 10 having an inlet fitting 11, two outlet openings 12 and 13 for the two streams of the fluid under pressure, and a vent or exhaust opening 14. A typical hydraulic system in which the flow divider valve 10 may be utilized to good advantage is shown schematically associated with valve 10 in Fig. 1. This system comprises a tank or reservoir 15 of oil or other hydraulic medium to be used in the system, the tank having an outlet line 16 leading therefrom to a pump 17 from which the fluid under pressure is conducted through a line 18 to inlet fitting 11 of valve 10. Vent opening 14 of the valve is connected by a line 19 to the inlet line 20 for the tank 15.

The first stream from flow divider valve 10 may leave the valve through outlet opening 12 and through a line 21 to a control valve 22 of known construction for controlling the operation of a two-way work cylinder 23, the piston rod 24 of which may be connected to the load to be operated by the cylinder such for example as a lift mechanism for farm tools or earth moving equipment. The second stream from flow divider valve 10 leaves outlet opening 13 through a line 25 and may be connected through said line 25 to the inlet for a power steer valve 26 which is connected through lines 27 and 28 to the power cylinder 29 for operating the steering link 30 of the vehicle. The return line 31 from the control valve 22 and the return line 32 from the power steer valve 26 are connected to the return or inlet line 20 for tank 15.

The system just described is mounted on a vehicle so that the engine used to drive the vehicle is also available to drive pump 17. It may be assumed for purposes of illustration that the system is used with a farm tractor and that the work cylinder 23 is generally available for lifting any one of the numerous tools that the tractor is designed to operate. In such illustrative example it is desirable, of course, to decrease the cost of the tractor as a whole, including its hydraulic system, and to this end it is desirable to use but one pump for the system. Furthermore, it is also desirable to keep the size of the pump as small as possible and, in general, to handle the least amount of fluid. These desirable characteristics can be obtained by the flow divider valve of this invention, the details of construction of which are now to be described.

Flow divider 10 is comprised of a body 33 having a recess 34 therein in which is mounted a sleeve 35. Said sleeve is sealed with respect to recess 34 by a suitable packing ring 36 which is preferably in the form of an endless elastomeric O-ring of circular radial cross section. The right-hand end of sleeve 35 as viewed in Fig. 1 is closed by a plug 37 having a shoulder 38 upon which the sleeve 35 is press fitted. The right-hand portion of sleeve 35 as viewed in Fig. 1 is reduced in its outside diameter to form an annular space 39 with recess 34, and plug 37 has slots in the end thereof to form axially extending spacer lugs 40 which locate the plug and sleeve 35 in recess 34. Said recess 34 is preferably formed coaxially with outlet opening 13 and communication between space 39 around sleeve 35 and outlet opening 13 is established through the space 41 formed by lugs 40 between the bottom wall 42 of recess 34 and plug 37.

The opposite end of sleeve 35 is also formed with a reduced outside diameter 43 which is axially aligned with outlet opening 12 so that said outlet opening is in hydraulic communication with the annular space 44 around this portion of sleeve 35. Recess 34 is slightly enlarged at 45 and internally threaded to receive fitting 11. Said fitting 11 is formed with an opening 46 in axial alignment with recess 34 and sleeve 35.

Communication between opening 46 in fitting 11 and outlet openings 12 and 13 is controlled by an axially slidable valve element 47 of generally cylindrical external form and cup-shaped to provide a deep recess 48 therein. Said valve element 47 is reciprocable in sleeve 35, said sleeve having a cylindrical interior surface 49 with a sliding fit with the exterior cylindrical surface of valve element 47. It may be noted that opening 46 in fitting 11 is of smaller diameter than the outside diameter of valve element 47 so that when said element is in its left-hand position as shown in Fig. 1, said element will abut on fitting 11 and will have the left-hand limit of its movement determined by said fitting.

A knife edge or line contact is established between fitting 11 and sleeve 35 to provide a fluid tight seal therebetween. To this end sleeve 35 is provided with a radial surface 51 adjacent fitting 11, and fitting 11 has a thin outwardly flared frusto conical flange 52 formed therein which terminates in a circular edge 53 adjacent the radial surface 51 on sleeve 35. Fitting 11 is externally threaded to engage the internally threaded recess 45, and is also provided with a radial flange 54 adapted to abut on the exterior surface 55 of valve body 10 to limit its inward movement.

The axial length of sleeve 35 including plug 37 and its lugs 40, plus the length of fitting 11 from flange 54 to edge 53 of flange 52 is initially slightly longer than the axial length of recess 34 from its bottom wall 42 to outer surface 55 on body 10 so that when fitting 11 is tightened in the threaded recess 45 with flange 54 abutting on outer surface 55, flange 52 will be slightly deformed and edge 53 will be caused to bite into radial surface 51 on sleeve 35 to form the requisite fluid-tight seal between fitting 11 and sleeve 35. An elastomeric packing ring or O-ring 56 may be used between fitting 11 and an appropriate annular recess in body 10 to effect a fluid-tight seal between the fitting and body.

Valve element 47 is urged to the left-hand position shown in Fig. 1 by a spring 57 compressed between the bottom of recess 48 of the valve element and plug 37. In the form illustrated the force of spring 57 cannot be regulated so that once the spring is determined upon and installed, the position of valve element 47 for any given pressure in inlet opening 46 is fixed. Movement of valve element 47 to the right as viewed in Figs. 1 and 2 is limited by a pin 60 threaded at its right-hand end as viewed in Figs. 1 and 2 and received in a similarly threaded opening 61 through plug 37. Opening 61 passes through a boss 89 the sides of which are slotted as shown in dotted outline at 90 and pinched together to provide a locking effect upon pin 60.

Fluid communication between space 39 and inlet opening 46 in fitting 11 is established through an orifice 58 in valve element 47 and a plurality of radial openings 59 in sleeve 35 in communication with space 39. Said orifice determines the initial proportion of flow as between the two outlet streams issuing from openings 12 and 13.

It is a feature of this invention that the location of pin 60 relative to plug 37 may be adjusted to control the point at which restriction of the flow through orifice 58 into outlet opening 13 begins. To this end pin 60 is provided with a screwdriver slot 62 (Fig. 2) by which the pin may be turned relative to plug 37 to adjust its position as aforesaid. It may be noted that the pin and screwdriver slot 62 are accessible only when line 25 is disconnected from outlet opening 13 and hence unauthorized tampering with the setting of pin 60 is thus minimized.

It has been found that if flow through orifice 58 were to be completely cut off, either by pin 60 or by a complete closing of radial openings 59 by valve element 47, the pressure behind the valve element would drop to the point where spring 57 would be unable to overcome the pressure of the fluid in inlet opening 46. This of course would be particularly true if valve 26 were operated in a manner to open line 25 to one side or the other of power cylinder 29. To insure the continued operation of the valve element under the control of spring 57, provision is made as shown more clearly in Figs. 2 and 4 to insure a continuous flow, though greatly restricted, through orifice 58 and into outlet opening 13. This is accomplished, first, by adjusting pin 60 relative to plug 37 in such a manner that valve element 47 strikes the end of pin 60 before the valve element completely closes radial openings 59 as shown in Fig. 2. This assures a means for fluid to flow from the interior of valve element 47 through openings 59 and into space 39. Next, continuous flow around pin 60 is assured by grinding a step 63 over substantially half its area so that fluid may continue to flow through orifice 58 and into recess 48 in valve element 47, and thence around the end of valve element 47 through radial openings 59 and into space 39.

The upper limit of pressures in lines 21 and 25 may be fixed by the pressure relief valve now to be described.

Valve body 10 has a recess 64 formed therein to intersect vent opening 14 and passages 65 and 66 communicating with the end regions thereof. Passage 65 opens into annular space 44 and passage 66 opens into annular space 39 so that the pressures at opposite ends of recess 64 are those existing in lines 21 and 25, respectively. Passage 65 terminates in a conical seat 67 on which is disposed a ball valve 68. Intermediate ball 68 and the terminus of passage 66 in recess 64 is a screw 69 having an opening 70 therein terminating in a conical seat 71 on which is disposed a ball valve 72. Balls 68 and 72 are held against their respective seats by a spring 73 which is in compression between the two balls and which is prevented from buckling by a pin 74 disposed on the interior of the spring.

It may be noted that the unseating pressure for each ball is a function of the size of the opening and the unit pressure of the fluid therein. Thus if it is desired that ball 72 be released at a lower unit pressure than ball 68, all that is necessary to effectuate this operation is to make the diameter of opening 70 greater than that of opening 65, or, more accurately, to make the seat of ball 72 greater than the seat of ball 68. The exact diameter of the seat of ball 72 can be calculated from the pressure exerted by spring 73 and the maximum fluid pressure desired in line 25.

If the relief pressures, that is, the upper limit of pressures to be permitted in lines 21 and 25 is to be increased, this can be effected simply by advancing screw 69 into recess 64 to increase the compression of spring 73. The right-hand end of recess 64 as viewed in Fig. 1 is normally closed by a sealed screw plug 75, passage 66 opening into recess 64 at a point between the inner end of plug 75 and screw 69. The system must of course be closed down when it is desired to adjust the limiting pressures in lines 21 and 25 so that when screw plug 75 is removed to provide access to screw 69, there will be no surge of fluid through passage 66 and into the open recess 64.

Where independent individual adjustment is desired for setting the relief pressures in lines 21 and 25, the form of relief valve shown in Fig. 3 may be utilized. In this form a recess 76 may be drilled into valve block 10a with a smaller drilled opening 77 for establishing communication between recess 76 and vent opening 14. A passage 78 may be drilled through block 10a to intersect recess 76 and establish communication with space 39 around sleeve 35. The open end of passage 78 may be plugged by a steel ball 79 such as a ball bearing, which has an interference fit with opening 76 of approximately .005 inch. A valve element 80 is slidably received in recess 76 and has a region of smaller diameter at its left-hand end as viewed in Fig. 3 to provide annular space 81 around the valve element 80 in communication with passage 78 and annular space 39. The end 82 of valve element 80 may be chamfered to seat upon a similarly chamfered end of drilled opening 77.

It may be apparent that fluid under pressure in space 81 will exert a force on valve element 80 to the right as viewed in Fig. 3 to move said valve element away from its seat and to allow fluid to escape therearound into opening 77 and thence to vent opening 14. This movement to the right is counteracted by a spring 83 compressed between the bottom of a recess 84 in valve element 80 and the bottom of a similar recess 85 in a sealed screw plug 86 serving to close the right-hand end as viewed in Fig. 3 of recess 76. An opening 87 through valve element 80 connects recess 84 with opening 77 and thus prevents a build-up of fluid under pressure behind valve element 80 such as would destroy the effectiveness of the valve to open at the desired pressure.

It is understood that a valve similar to valve 80 may be arranged to control the maximum pressure in line 21 if desired. This type of valve, however, is not adjustable but adjustability, if desired, may be readily provided by those skilled in the art.

The flow divider valve 10 will assure a continuous stream of fluid under pressure into line 25 at all times and into line 21 when the valve element 47 is moved to the right against the action of spring 57 a sufficient distance to uncover openings 88 in sleeve 35. At this point openings 59 will begin to be covered by valve element 47 and orifice 58 will begin to approach the end of pin 60. The greater the pressure in inlet opening 46 and in line 21, the greater will be the movement of valve element 47 to the right as viewed in Figs. 1 and 2. However, the greater the movement of valve element 47 in such direction, the closer the end of pin 60 comes to orifice 58 and hence the greater the restriction of the flow through such orifice. Thus, the greater the demand in line 21 the less fluid will be diverted to line 25, the proportion of the flow as between lines 21 and 25 being adjustable through axial movement of pin 60 to suit the user's requirements. If the operations performed by work cylinder 23 require that the vehicle remain stationary so that no power for steering is simultaneously required, the flow in line 25 may be reduced as much as 75% or more. In other cases when slow maneuvering is necessary simultaneously with the operation of cylinder 23 the flow can be reduced to only 50% in which case the loss of fluid in the cylinder 23 due to a diversion into line 25 is still less than that encountered with the ordinary flow divider.

When the power steering cylinder 29 is in operation, that is, when valve 26 is not vented, pressure will build up in line 25 and outlet opening 13 and eventually behind valve element 47 to balance the fluid pressure acting upon the opposite side of said valve element. Spring 57, however, is continuously effective and will tend to move valve element 47 back to the position shown in Fig. 1. It is assumed that the quantity and pressure of fluid delivered from pump 17 into line 18 and inlet opening 46 is considerably greater than that absorbed by the power steering components and hence a partial closing of openings 88 leading to outlet opening 12 and line 21 will cause a build-up of pressure in inlet opening 46 to counteract spring 57. Thus the pressure of the fluid in inlet opening 46 and in the uncovered openings 88 exceeds the pressure in line 25 by the spring pressure, and flow through orifice 58 remains approximately constant even though the operation of pump 17 may be slowed down because of a reduction in speed of the driving engine to the point where opening 88 is closed. On the other hand when flow through outlet opening 13 is substantially zero, the pressure at outlet opening 12 increases due to the operation of the cylinder 23, and valve element 47 is pushed back against the action of spring 57 to tend to close the radial openings 59. This builds up the pressure in recess 48 until a balance is achieved. Although the openings 59 may at this point be restricted, nevertheless due to the increase in pressure in sleeve 35 an adequate flow of fluid is still maintained therethrough.

With the present valve, as stated above, the amount of flow into line 25 in relation to the pressure in line 21 can be adjusted by pin 60. Thus, assuming a pump delivery of 10 gallons per minute and zero demand in line 21, the flow in line 25 in a typical installation of valve 10 was 3.1 gallons per minute with a pressure in inlet opening of 55 pounds per square inch. When the pressure at the inlet end was raised to 500 p. s. i. the flow in line 25 decreased to 1.5 gallons per minute; at 1,000 p. s. i. the flow was still 1.5 gallons per minute and at 1500 p. s. i. the flow remained at 1.5 gallons per minute. This result was obtained by first adjusting pin 60 so that it completely closed orifice 58 and then gradually opening it until the foregoing flow in line 25 was achieved. Thus the ability of the valve to reduce the flow in one of the outlet lines therefrom while increasing that in the other of the lines is evident.

I claim:

1. A flow divider valve comprising a valve body having a recess therein, a first outlet opening from the bottom of the recess, a second outlet opening from the side of the recess, a threaded fitting partially closing the recess, a sleeve and a plug therefor in the recess in end-to-end relation with one another and with the fitting, said fitting having a flange abutting on a transverse wall on the valve body, a slidable valve in the sleeve and in one extreme position abutting on the fitting, said sleeve having an opening establishing communication between the interior of the sleeve and the exterior thereof, and said valve being slidable across said opening from a position blocking said opening to a position uncovering said opening, and deformable means between the sleeve and fitting for holding the sleeve against the plug and the plug against the valve body.

2. A flow divider as described in claim 1, said deformable means comprising an integral extension on one of the end-to-end related sleeve, plug and fitting, said extension being angularly disposed in an axial direction with respect to the sleeve and having a relatively sharp edge in contact with the adjacent end-to-end related sleeve, plug and fitting.

3. A flow divider as described in claim 1, said deformable means comprising an integral extension on the fitting, said extension being angularly disposed in an axial direction with regard to the sleeve and having a relatively sharp edge in contact with the sleeve whereby to function additionally as a rotation inhibiting means for the threaded fitting.

4. A flow divider as described in claim 1, said deformable means comprising an integral frusto-conical extension on the fitting in contact with the adjacent end of the sleeve.

5. A flow divider valve comprising a valve body having a recess therein, an outlet opening from the bottom of the recess, an outlet opening from the side of the recess, a threaded fitting partially closing the recess, a sleeve and a plug therefor in the recess in end-to-end relation with one another and with the fitting, a slidable valve in the sleeve said sleeve having axially spaced openings leading respectively to the first and second outlet openings, a valve axially slidable from a position closing one sleeve opening while uncovering the sleeve opening axially spaced therefrom to a position uncovering the said one sleeve opening and tending to close the said axially spaced sleeve opening, said valve having an orifice therethrough and being urged by fluid under pressure from the fitting in a direction to close the said axially spaced sleeve opening, and means for preventing such closing of the said axially spaced sleeve opening.

6. A flow divider as described in claim 5, the last-mentioned means comprising a pin mounted on the plug and extending toward the orifice, said pin contacting the valve and limiting movement of the valve toward closing the axially spaced sleeve opening as aforesaid.

7. A flow divider as described in claim 5, said last-mentioned means comprising a pin threaded into the plug and extending into proximity to the outlet opening from the bottom of the recess such that the pin is accessible through said outlet opening, said pin being adjustable to contact the valve and limiting movement of the valve toward closing the axially-spaced sleeve opening as aforesaid.

8. A flow divider as described in claim 5, said last-mentioned means comprising a pin mounted on the plug aligned with and extending toward the orifice, said pin contacting the valve and limiting movement of the valve toward closing the axially-spaced sleeve opening as aforesaid, said pin having further an unobstructed passage leading from the orifice to the exterior of the pin when the pin contacts the valve over the orifice.

9. A flow divider as described in claim 5, said plug having a boss and a threaded opening aligned with the orifice and extending through the plug and boss, said boss having a slot and being thereby radially deformable, said last-mentioned means comprising a pin threadedly received in the threaded opening in the plug and extending toward the orifice, said pin being held in any adjusted position thereof in the threaded opening by the deformed boss.

10. A flow divider valve comprising a valve body having an inlet opening, and axially spaced outlet openings, a slidable hollow valve normally closing the inlet opening and being movable by fluid under pressure at the inlet opening to open said inlet opening, said slidable valve having an orifice therein establishing communication through the interior of the valve with one of said outlet openings and thereby establishing one stream, said slidable valve when movable away from the inlet opening establishing communication with the other of the outlet openings and thereby establishing another stream, and pressure limiting means for both streams, said pressure limiting means including a spring-biased valve, said valve body having a recess therein for the spring-pressed valve and a passage from one of the streams in the valve body to the side of the spring-pressed valve to oppose the spring, and a vent opening for the pressure limiting valve.

11. A flow divider valve comprising a valve body having an inlet opening, and axially spaced outlet openings, a slidable valve normally closing the inlet opening and being movable by fluid under pressure at the inlet opening to open said inlet opening, said slidable valve having an orifice therein establishing communication through the interior of the valve with one of said outlet openings and thereby establishing one stream, said slidable valve when movable away from the inlet opening establishing another stream, and pressure limiting means for both streams, said pressure limiting means comprising opposed valve seats, ball valves disposed on the seats, and a common spring compressed between the balls and holding the balls on the seat, said valve body having a recess therein for the seats and passages from the streams, one to each seat to the side thereof to oppose the balls and tend to unseat them, and a vent opening for the recess.

12. A flow divider valve as described in claim 11, the effective area of the seats being different to provide different limiting pressures for each of the streams.

13. A flow divider valve as described in claim 11, one of said seats being in the form of a screw, the seat recess in the valve body being threaded to receive the screw, and a removable plug for the seat recess whereby to provide access to the screw.

14. A flow divider valve comprising a valve body having an inlet opening and axially spaced outlet openings, a slidable valve normally closing the inlet opening and being movable by fluid under pressure at the inlet opening to open said inlet opening, said slidable valve having an orifice therein establishing communication through the interior of the valve with one of said outlet openings and thereby establishing one stream, said slidable valve when movable away from the inlet opening establishing another stream, and pressure limiting means for the first-mentioned stream, said pressure limiting means comprising a valve having at least a portion of one side thereof exposed to the fluid in the first-mentioned stream, a recess in the valve body to receive the pressure responsive valve, said recess including a valve seat and a vent opening in communication therewith, said valve having an opening therethrough from the seat to vent the side of the valve opposite the side exposed to the said first-mentioned stream and resilient means urging the pressure limiting valve against its seat.

References Cited in the file of this patent

UNITED STATES PATENTS

| | | |
|---|---|---|
| 2,500,627 | Chinn | Mar. 14, 1950 |
| 2,624,361 | Brown | Jan. 6, 1953 |
| 2,737,196 | Eames | Mar. 6, 1956 |
| 2,749,935 | Heard | June 12, 1956 |